Patented Sept. 29, 1953

2,653,973

UNITED STATES PATENT OFFICE 2,653,973

ETHYLENE SULFONYL FLUORIDE AND ITS METHOD OF PREPARATION

Ross M. Hedrick, Dayton, Ohio, assignor to Monsanto Chemical Company, St. Louis, Mo., a corporation of Delaware No Drawing. Application July 28, 1950,
Serial No. 176,535

4 Claims. (Cl. 260—543)

The present invention relates to organic fluorine compound and relates more particularly to olefinic compounds containing sulfur and fluorine.

An object of the invention is the provision of a new copolymerizable fluorine compound. Another object of the invention is the preparation of a compound which will copolymerize with known monomeric materials to give synthetic resins and plastics possessing improved properties. Still another object of the invention is the provision of a method for the production of the new copolymerizable fluorine compound in good yields and from readily available raw materials.

These and other objects hereinafter disclosed are provided by the following invention wherein ethylenesulfonyl fluoride, a new compound, is prepared by condensing ethylenesulfonyl chloride, with an inorganic fluoride substantially according to the scheme $$CH_2=CHSO_2Cl+XF \rightarrow CH_2=CHSO_2F+XCl$$

in which X is a member of the class consisting of ammonium, alkali metal and alkaline earth metal. Inorganic fluorides which may be employed include sodium, potassium, lithium, calcium, barium, strontium and magnesium fluorides.

The ethylenesulfonyl fluoride is formed by contacting ethylenesulfonyl chloride with the inorganic fluoride at ordinary or increased temperatures, depending upon the nature of the individual reactants employed as well as upon such factors as mechanical agitation, time, etc. In order to facilitate intimate contact of the alkali fluoride with the ethylenesulfonyl chloride I may employ a solution of the inorganic fluoride. Solvents which may be employed include water or water and alcohol mixtures, depending upon the solubility properties of the individual inorganic fluoride employed. In some instances, an inert diluent, e. g., acetone, ether, nitrobenzene, etc., may be used.

When working with the alkali metal fluoride, and particularly with potassium fluoride, I find that reaction takes place readily without employing external heating. In this case, an aqueous solution of the potassium fluoride is simply added to the ethylenesulfonyl chloride and the reaction mixture is allowed to stand, advantageously with mechanical stirring until formation of the ethylenesulfonyl fluoride. Depending upon the quantities of reactants employed, the condensation is completed within a period ranging of from say an hour to several hours. When operating with potassium fluoride it is advantageous, for easy recovery of the final product, to employ as concentrated an aqueous solution as possible.

Potassium fluoride is very soluble in water, but potassium chloride, the salt which is formed by the reaction, is much less soluble. Hence when working with a concentrated solution of potassium fluoride, the progress of the reaction may be gauged by noting the formation of potassium chloride which begins to precipitate out as the quantity of the chloride produced exceeds its limit of solubility in the water present.

Inasmuch as molar equivalents of the reactants are involved in the formation of ethylenesulfonyl fluoride from ethylenesulfonyl chloride and the inorganic halide, the reactants are advantageously employed in stoichiometric proportions. However, since an excess of either of the two reactants may be readily recovered from the final product, the proportion which is initially employed is immaterial. In order to assure complete reaction of the less readily available ethylenesulfonyl chloride, I generally prefer to employ an excess of the inorganic fluoride.

The easy conversion of ethylenesulfonyl chloride to ethylenesulfonyl fluoride is surprising, for under the reaction conditions employed an exchange of the chlorine for fluorine would not be expected to take precedence over such seemingly more probable reactions as hydrolysis of the acid halide to the sulfonic acid, polymerization of the ethylenesulfonyl chloride, etc.

Ethylenesulfonyl fluoride is a clear, almost colorless rather high-boiling liquid which is stable under ordinary atmospheric conditions. Upon long standing it tends to undergo some polymerization; hence, when storage is contemplated, it is advisable to add to the ethylenesulfonyl fluoride a small quantity of a polymerization inhibitor, e. g., hydroquinone, tert-butyl-catechol etc.

Ethylenesulfonyl fluoride is valuable as a copolymerizing monomer for the preparation of improved synthetic resins and plastics. When subjected to polymerizing conditions in admixture with monomeric compounds which are copolymerizable it contributes essentially to the heat stability and plasticity of the final products. Copolymerizable monomers which may be employed with ethylenesulfonyl fluoride include compounds having the vinyl ($CH_2=CH-$) radical, for example, acrylic and methacrylic acid and their esters and nitriles; vinyl substituted aromatic compounds such as styrene and vinylbiphenyl, halides, such as vinyl chloride and vinylidene chloride, ketones such as methyl vinyl ketone and isopropenyl methyl ketone, dienic hydrocarbons such as butadiene and isoprene, etc. Of particular interest are the copolymers of ethylenesulfonyl fluoride and acrylic or methacrylic acid and their derivatives, and especially the copolymers of ethylenesulfonyl fluoride and acrylonitrile or methacrylonitrile. When copolymerized with the acrylic compounds, the ethylenesulfonyl fluoride confers both increased plasticity and increased thermal stability to the final product.

Thus, there may be prepared resinous and plastic copolymers of from, say 5% to 95% by weight of ethylenesulfonyl fluoride and from 95% to 5% by weight of one or more monomers copolymerizable with the ethylenesulfonyl fluoride.

The invention is further illustrated, but not limited, by the following examples:

Example 1

To 6.2 g. (0.05 mole) of ethylenesulfonyl chloride there was added a solution of 5.8 g. (0.10 mole) of potassium fluoride in 8 ml. of water. The resulting mixture was shaken for several hours, and then diluted with water to dissolve the precipitated potassium chloride. The organic layer which separated out was extracted with ether. Distillation of the ether extract, after drying, gave 3.1 g. of ethylenesulfonyl fluoride, B. P. 45° C. to 46.5° C./52 mm.

Example 2

The procedure of Example 1 was repeated, except that there was employed 68.5 g. of ethylenesulfonyl chloride and 65 g. of potassium fluoride in 85 ml. of water, and that shaking of the resulting mixture was effected during a period of 5.5 hours. There was thus obtained 44.4 g. (75% theoretical yield) of ethylenesulfonyl fluoride, B. P. 44–46° C./50 mm.

Instead of employing emulsion polymerization, ethylenesulfonyl fluoride may be copolymerized with acrylonitrile by employing other polymerizing techniques, for example, by copolymerization in mass or in solution. The proportion of ethylenesulfonyl fluoride to acrylonitrile may be widely varied, e. g., there may be employed, from, say 5% to 95% by weight of ethylenesulfonyl fluoride based on the weight of acrylonitrile.

Ethylenesulfonyl fluoride may be similarly copolymerized with other vinyl compounds to give products having improved heat-stability and plasticity.

What I claim is:

1. Ethylenesulfonyl fluoride.
2. The method which comprises contacting ethylenesulfonyl chloride with an aqueous solution of an inorganic fluoride selected from the class consisting of ammonium, alkali metal and alkaline earth metal fluorides and recovering ethylenesulfonyl fluoride from the resulting reaction product.
3. The method which comprises contacting ethylenesulfonyl chloride with an aqueous solution of an alkali metal fluoride and recovering ethyenesulfonyl fluoride from the resulting reaction product.
4. The method which comprises contacting ethylenesulfonyl chloride with an aqueous solution of potassium fluoride and recovering ethylenesulfonyl fluoride from the resulting reaction product.

ROSS M. HEDRICK.

References Cited in the file of this patent

UNITED STATES PATENTS

| Number | Name | Date |
|---|---|---|
| 2,174,856 | Johnson | Oct. 3, 1939 |
| 2,276,097 | Salzberg | Mar. 10, 1942 |
| 2,348,705 | Alderman et al. | May 16, 1944 |
| 2,449,528 | Flowers et al. | Sept. 14, 1948 |
| 2,489,317 | Proell | Nov. 29, 1949 |

OTHER REFERENCES

Davies et al.—Chem. Soc. Jour., London Proc. (1932), pp. 483–486.

Landau—J. Am. Chem. Soc., vol. 69, p. 1219 (1947).